United States Defensive Publication [19] (H) [11] T979,008

Pezzoli [43] Feb. 6, 1979

[54] ASBESTOS TREATMENT WITH METAL ORTHOPHOSPHATES

[76] Inventor: Paul A. Pezzoli, 4910 Artcrest Dr., Midland, Mich. 48640

[21] Appl. No.: 893,240

[22] Filed: Apr. 4, 1978

Related U.S. Application Data

[63] Continuation of Ser. No. 756,291, Jan. 3, 1977, abandoned.

[51] Int. Cl.[2] ..... B05D 7/00

[52] U.S. Cl. ..... 427/215; 423/311; 424/128; 427/2; 427/299; 427/343; 427/419 R

[57] ABSTRACT

A method for treating asbestos to reduce its hemolytic activity is disclosed. The method comprises depositing on at least a portion of the asbestos a sufficient amount of a material consisting essentially of at least one water-insoluble metal orthophosphate to reduce the hemolytic activity of the asbestos. The resulting fibrous asbestos product consists essentially of asbestos fibers having at least one water-insoluble metal orthophosphate deposited thereon. Suitable metals include magnesium, calcium, barium, titanium (III), titanium (IV), chromium, manganese, iron (II), iron (III), cobalt, nickel, zirconium, silver, aluminum, zinc, cadmium, tin (II), tin (IV), and lead.

36 Claims, No Sheets Drawing,

33 Pages Specification

The file of this unexamined application may be inspected and copies thereof may be purchased (849 O.G. 1221, Apr. 9, 1968).